US009981510B2

(12) United States Patent
Kuriyama et al.

(10) Patent No.: US 9,981,510 B2
(45) Date of Patent: May 29, 2018

(54) PNEUMATIC TIRE

(71) Applicant: The Yokohama Rubber Co., LTD., Minato-ku, Tokyo (JP)

(72) Inventors: Masatoshi Kuriyama, Hiratsuka (JP); Masatoshi Shimizu, Hiratsuka (JP); Shinya Harikae, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 296 days.

(21) Appl. No.: 14/648,680

(22) PCT Filed: Nov. 29, 2013

(86) PCT No.: PCT/JP2013/082242
§ 371 (c)(1),
(2) Date: May 29, 2015

(87) PCT Pub. No.: WO2014/084370
PCT Pub. Date: Jun. 5, 2014

(65) Prior Publication Data
US 2015/0306920 A1    Oct. 29, 2015

(30) Foreign Application Priority Data
Nov. 30, 2012   (JP) ................................. 2012-263175

(51) Int. Cl.
*B60C 15/00*    (2006.01)
*B60C 15/06*    (2006.01)
(Continued)

(52) U.S. Cl.
CPC ............ *B60C 15/0036* (2013.01); *B60C 5/00* (2013.01); *B60C 9/08* (2013.01); *B60C 9/20* (2013.01);
(Continued)

(58) Field of Classification Search
CPC ........................ B60C 15/0036; B60C 15/0045
See application file for complete search history.

(56) References Cited

U.S. PATENT DOCUMENTS

2007/0029022 A1* 2/2007 Tanaka ................ B60C 15/0036
                                                            152/541
2012/0132338 A1    5/2012 Horiuchi
2012/0222790 A1    9/2012 Copeland et al.

FOREIGN PATENT DOCUMENTS

JP    H02-18104     1/1990
JP    H05-124408    5/1993
(Continued)

OTHER PUBLICATIONS

International Search Report for International Application No. PCT/JP2013/082242 dated Mar. 4, 2014, 4 pages, Japan.

*Primary Examiner* — Timothy Kennedy
(74) *Attorney, Agent, or Firm* — Thorpe North & Western (57) ABSTRACT

A pneumatic tire has two carcass layers including carcass cords are laid between a pair of bead portions, bead cores and bead fillers are disposed in the bead portions, and at least two belt layers are disposed on the outer circumferential side of the carcass layers, the tire being characterized in that both ends of the inner carcass layer are folded back from the tire inner side to the tire outer side around the bead cores, and the ends of the folded back portions of the inner carcass layer are disposed between the innermost belt layer and the outer carcass layer, while both ends of the outer carcass layer are disposed so as to pass between a main portion of the inner carcass layer and the bead fillers, and both ends of the outer carcass layer terminate at the bead portions without being folded back around the bead cores.

20 Claims, 8 Drawing Sheets

(51) Int. Cl.
*B60C 9/08* (2006.01)
*B60C 9/20* (2006.01)
*B60C 5/00* (2006.01)
*B60C 9/02* (2006.01)

(52) U.S. Cl.
CPC ...... *B60C 15/0018* (2013.01); *B60C 15/0045* (2013.01); *B60C 15/0603* (2013.01); *B60C 15/0607* (2013.01); *B60C 2009/0215* (2013.01); *B60C 2015/0617* (2013.01); *B60C 2015/0621* (2013.01); *B60C 2015/0625* (2013.01)

(56) References Cited

FOREIGN PATENT DOCUMENTS

| | | |
|---|---|---|
| JP | H11-321217 | 11/1999 |
| JP | 2000-211317 | 8/2000 |
| JP | 2002-166710 | 6/2002 |
| JP | 2004-099804 | 4/2004 |
| JP | 2012-051512 | 3/2012 |
| JP | 2012-116212 | 6/2012 |
| WO | WO 2012/118727 | 9/2012 |

* cited by examiner

PNEUMATIC TIRE

TECHNICAL FIELD

The present technology relates to a pneumatic tire provided with a plurality of carcass layers, and, more specifically, to a pneumatic tire that allows for reduced tire weight and rolling resistance while maintaining good steering stability, and allows for improved separation resistance.

BACKGROUND

A reinforcing structure in which a plurality of carcass layers is laid between a pair of bead portions in order to maintain high internal pressure is used in pneumatic tires. For example, a pneumatic tire has been proposed having a so-called 2-1F ply lock structure in which three carcass layers are laid between a pair of bead portions, and both ends of the two inner carcass layers are folded back from a tire inner side to a tire outer side around bead cores, while both ends of the outermost carcass layer are disposed to the outer side of the folded back portions of the inner carcass layers in a tire width direction (see, for example, Japanese Unexamined Patent Application Publication No. H11-321217).

Figure 8:
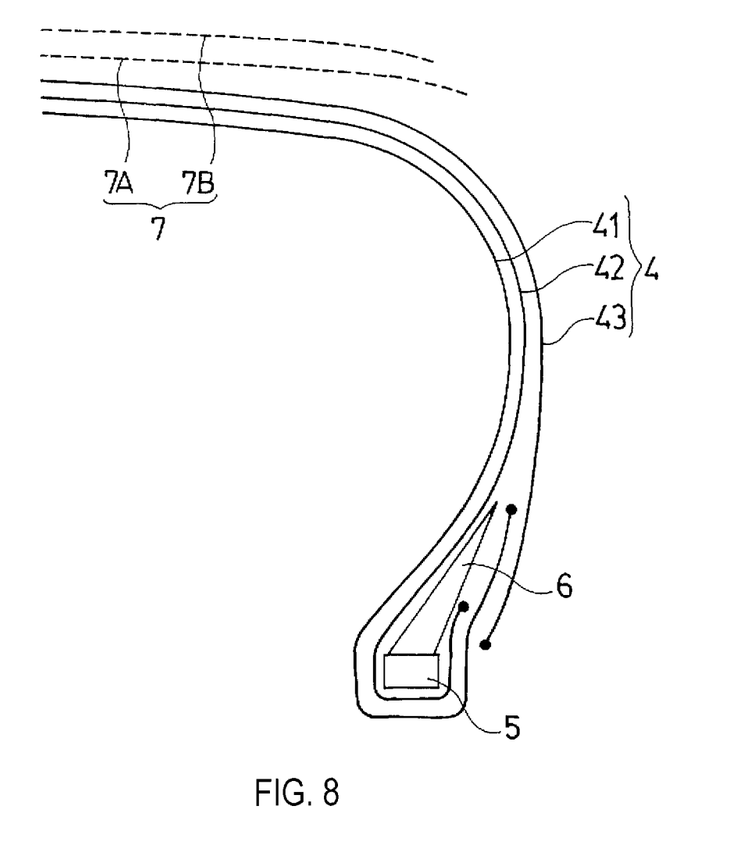
FIG. 8 is a meridian cross-sectional view schematically illustrating a pneumatic tire having a conventional 2-1F ply lock structure.

FIG. 8 schematically illustrates a conventional pneumatic tire having a 2-1F ply lock structure. As illustrated in FIG. 8, both ends of inner carcass layers 41, 42 are folded back from the tire inner side to the tire outer side around a bead core 5, and both ends of an outer carcass layer 43 are disposed to the outer side of the folded back portions of the inner carcass layers 41, 42. In a pneumatic tire having such a 2-1F ply lock structure, the presence of the three carcass layers 41, 42, 43 in the side wall portions allows for excellent steering stability.

However, pneumatic tires are frequently subjected to severe usage conditions, such as high load states caused by vehicle overloading or high internal pressure states intended to ensure load capacity; thus, if the ends of multiple carcass layers are disposed at locations of the bead portions or side wall portions where flexing tends to occur, separation failure originating at these ends easily occurs. In addition, the use of three carcass layers also increases the tire weight, leading to a problematic increase in the rolling resistance of the tire.

The problems described above can be overcome by reducing the number of carcass layers, but this will reduce the rigidity of the tire as a whole, potentially reducing steering stability.

SUMMARY

The present technology provides a pneumatic tire that allows for reduced tire weight and rolling resistance while maintaining good steering stability, and allows for improved separation resistance.

A pneumatic tire of the present technology is a pneumatic tire in which two carcass layers including a plurality of carcass cords are laid between a pair of bead portions, bead cores and bead fillers are disposed in the bead portions, and at least two belt layers are disposed on the outer circumferential side of the carcass layers, the tire being characterized in that both ends of the inner carcass layer are folded back from the tire inner side to the tire outer side around the bead cores, and the ends of the folded back portions of the inner carcass layer are disposed between the innermost belt layer and a main portion of the inner carcass layer, while both ends of the outer carcass layer are disposed further outward in a tire width direction than the folded back portions of the inner carcass layer and extend to a position at least overlapping the bead fillers, and both ends of the outer carcass layer terminate at the bead portions without being folded back around the bead cores.

In the present technology, both ends of the inner carcass layer are folded back from the tire inner side to the tire outer side around the bead cores, and the folded back portions of the inner carcass layer extend to a position overlapping the innermost belt layer, while both ends of the outer carcass layer terminate at the bead portions without being folded back around the bead cores, with the result that the carcass layers form a three-ply structure at the side wall portions that ensures sufficient rigidity on the part of the pneumatic tire, allowing for excellent steering stability. Meanwhile, only two carcass layers are used for the framework of the tire, eliminating as much of the excess portions of the carcass layers as possible, with the result that the tire weight, and, in addition, the rolling resistance of the tire, can be reduced compared to a pneumatic tire provided with three carcass layers as in the conventional art.

In accordance with the configuration of the present technology as described above, there are carcass layer ends at two locations per side of the tire, one of which is at a position at which there is little strain between the innermost belt layer and the inner carcass layer, thereby suppressing separation failure originating from the ends of the carcass layers and allowing for improved separation resistance.

In the present technology, an overlap W between the folded back portions of the inner carcass layer and the innermost belt layer is preferably from 5 mm to 40 mm. This ensures excellent separation resistance.

Preferably, ends of the outer carcass layer are disposed further outward in a tire radial direction than an outermost edge of the bead cores in the tire radial direction, and the ends of the outer carcass layer are separated from an outermost edge of the bead filler in the tire radial direction by at least 10 mm inward in the tire radial direction. This enables good separation resistance to be secured by ensuring sufficient overlap between the outer carcass layer and the bead filler, while also securing sufficient steering stability by avoiding overlap between the outer carcass layer and the bead core.

The bead fillers are preferably divided with respect to the tire radial direction into inner fillers and outer fillers, with the ends of the outer carcass layer being disposed further inward in the tire radial direction than the outer filler, and the outer filler having a JIS (Japanese Industrial Standard) hardness that is lower than the JIS hardness of the inner filler. This reduces the rigidity in the tire radial direction, enabling reduction in rolling resistance. Also, although bending deformation of the bead filler may occur during traveling, the separation resistance may be improved by disposing the ends of the outer carcass layer at a position corresponding to the relatively harder inner filler.

Further, a cushioning rubber layer having a breaking strength of at least 20 MPa is preferably disposed between the ends of the outer carcass layer and the folded back portions of the inner carcass layer. Accordingly, separation failure originating from the ends of the outer carcass layer is suppressed, allowing for improved separation resistance.

Furthermore, a coating rubber of the inner carcass layer and the outer carcass layer preferably has a breaking strength of at least 20 MPa. This also allows for improved separation resistance, similar to those provided by inserting a cushioning rubber layer between the ends of the outer carcass layer and the folded back portions of the inner carcass layer.

Preferably, in the present technology, the outer carcass layer has a hollow structure divided in the region underneath the belt layer, and an inner end in the tire width direction of each section of the outer carcass layer is disposed at a position separated from the end of the folded back portion of the inner carcass layer by at least 5 mm in the tire width direction. Using the outer carcass layer having a hollow structure in the region underneath the belt layer enables the tire weight to be reduced without causing any problem with tire properties. This also enables degradation of the separation resistance to be avoided by making the position of the inner end in the tire width direction of each section of the outer carcass layer appropriate.

In the present technology, "JIS hardness" is durometer hardness as measured according to JIS K-6253 using a type A durometer at a temperature of 20° C. "Breaking strength" is tensile strength as measured according to JIS K-6251 using a dumbbell-shaped test piece at a temperature of 20° C.

DETAILED DESCRIPTION

A detailed description of the configuration of the present technology is given below, with reference to the accompanying drawings. FIGS. 1 to 6 illustrate a pneumatic tire according to an embodiment of the present technology.

Figure 1:
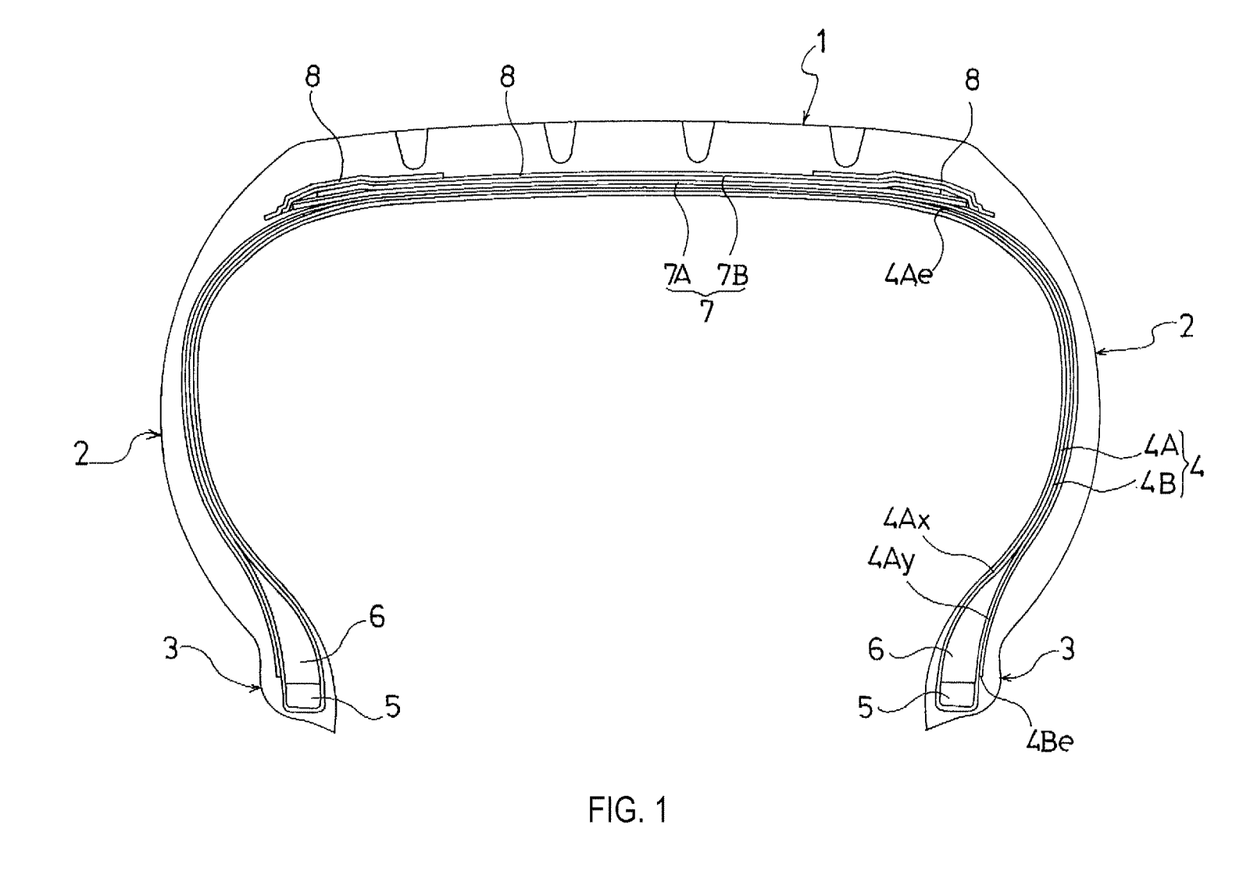
FIG. 1 is a meridian cross-sectional view illustrating a pneumatic tire according to an embodiment of the present technology.

As illustrated in FIG. 1, the pneumatic tire of the present embodiment is provided with a tread portion 1 extending in the tire circumferential direction in an annular shape, a pair of side wall portions 2 disposed on both sides of the tread portion 1, and a pair of bead portions 3 disposed on the inner side of the side wall portions 2 in the tire radial direction.

Two carcass layers 4 including a plurality of carcass cords that extend in the tire radial direction are laid between the pair of bead portions 3, 3. The carcass layers 4 include an inner carcass layer 4A positioned to the inside in the tire radial direction in the tread portion 1 and an outer carcass layer 4B positioned to the outside in the tire radial direction in the tread portion 1. Organic fiber cords of nylon, polyester, or the like are preferably used as the carcass cords constituting the two carcass layers 4. Annular bead cores 5 are embedded within the bead portions 3, and bead fillers 6 made of a rubber composition and having a triangular cross section are disposed on the outer peripheries of the bead cores 5.

At least two belt layers 7 are embedded in the outer peripheries of the carcass layers 4 in the tread portion 1. The belt layers 7 include an innermost belt layer 7A positioned to the inside in the tire radial direction and an outermost belt layer 7B positioned to the outside in the tire radial direction. The belt layers 7 include a plurality of reinforcing cords that are oblique with respect to the tire circumferential direction, and are disposed between the layers so that the reinforcing cords intersect. In the belt layers 7, the angle of the reinforcing cords with respect to the tire circumferential direction is set in a range of, for example, 10° to 40°. Steel cords are preferably used as the reinforcing cords of the belt layers 7.

For the purpose of enhancing high-speed durability, at least one belt cover layer 8 formed by arranging reinforcing cords at an angle of not more than 5° with respect to the tire circumferential direction is disposed on the outer circumferential side of the belt layers 7. The belt cover layer 8 preferably has a jointless structure in which a strip material made from at least a single reinforcing cord laid in parallel and covered with rubber is wound continuously in the tire circumferential direction. The belt cover layer 8 can also be disposed so as to cover the belt layers 7 at all positions along the width direction, or so as to cover only the outer edge portions of the belt layers 7 in the width direction. Nylon, aramid, or similar organic fiber cords are preferably used as the reinforcing cords of the belt cover layer 8.

In the pneumatic tire described above, both ends of the inner carcass layer 4A are folded back from the tire inner side to the tire outer side around the bead cores 5, and are disposed so as to enfold the bead cores 5 and the bead fillers 6. The inner carcass layer 4A comprises an interior main portion 4Ax and an exterior folded back portion 4Ay, the bead core 5 constituting the boundary between the two. An end 4Ae of the folded back portion 4Ay of the inner carcass layer 4A is disposed between the innermost belt layer 7A and the main portion 4Ax of the inner carcass layer 4A. Meanwhile, both ends of the outer carcass layer 4B are disposed further outward in a tire width direction than the folded back portion 4Ay of the inner carcass layer 4A, and extend to a position at least overlapping the bead filler 6. Both ends of the outer carcass layer 4B terminate at the respective bead portions 3 without being folded back around the bead core 5. That is, ends 4Be of the outer carcass layer 4B are disposed near the bead cores 5.

In the pneumatic tire described above, both ends of the inner carcass layer 4A are folded back from the tire inner side to the tire outer side around the bead cores 5, and the folded back portions 4Ay of the inner carcass layer 4A extend to positions overlapping the innermost belt layer 7A, while both ends of the outer carcass layer 4B terminate at the bead portions 3 without being folded back around the bead cores 5, with the result that the carcass layers 4 form a three-ply structure at the side wall portions 2 that ensures sufficient rigidity on the part of the pneumatic tire, allowing for excellent steering stability.

Meanwhile, only two carcass layers are used for the framework of the tire, eliminating as much of the excess portions of the carcass layers as possible, with the result that the tire weight can be reduced compared to a pneumatic tire provided with three carcass layers as in the conventional art. In particular, because the folded back portions 4Ay of the inner carcass layer 4A extend to positions overlapping the innermost belt layer 7A, it is possible for the carcass layers 4 to form a three-ply structure at the side wall portions 2 while forming a two-ply structure in the region underneath the belt layers 7 in the tread portion 1. In addition, because both ends of the outer carcass layer 4B are not folded back around the bead cores 5, the weight around the bead portions 3 can be reduced. This allows the tire weight to be reduced, thereby concurrently reducing the rolling resistance of the tire.

Moreover, in accordance with the pneumatic tire described above, there are ends (4Ae, 4Be) of the carcass layers 4 at two locations per side of the tire, one of which is at a position at which there is little strain between the innermost belt layer 7A and the inner carcass layer 4A, thereby suppressing separation failure originating from the ends of the carcass layers 4 and allowing for improved separation resistance.

Figure 2:
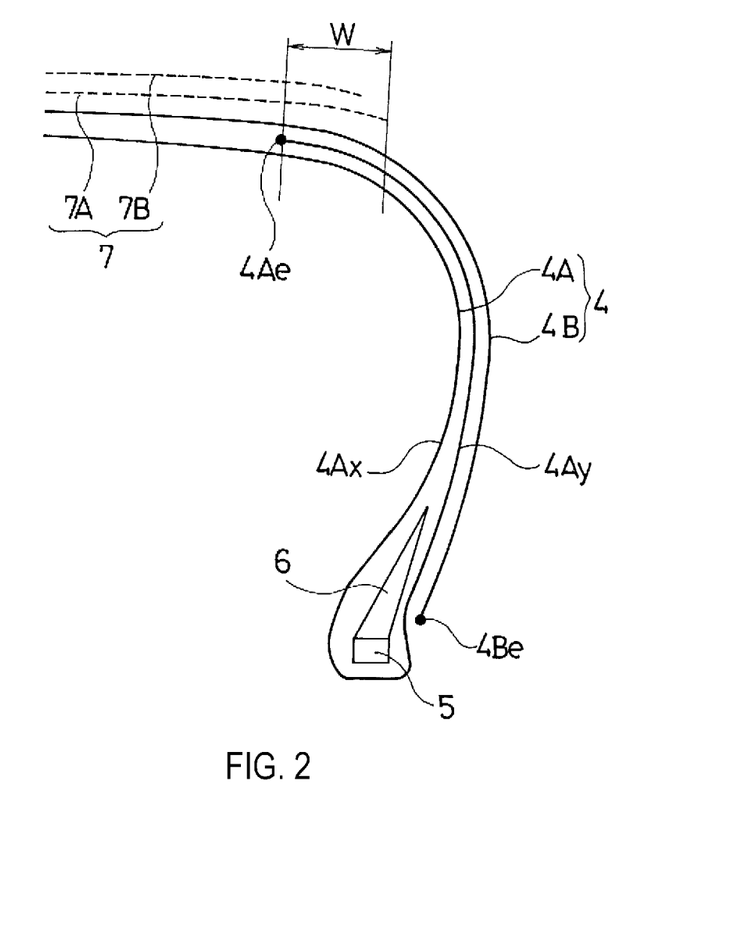
FIG. 2 is a half cross-sectional view taken along a meridian schematically illustrating the pneumatic tire of FIG. 1.

As illustrated in FIG. 2, the overlap W between the folded back portion 4Ay of the inner carcass layer 4A and the innermost belt layer 7A is preferably from 5 mm to 40 mm. This ensures excellent separation resistance. If the overlap W is less than 5 mm, the end 4Ae of the inner carcass layer 4A and the end of the innermost belt layer 7A will be close together, reducing effectiveness in improving separation resistance; conversely, if the overlap W exceeds 40 mm, the amount of carcass layer 4 used will increase, reducing effectiveness in reducing rolling resistance. For considerations of separation resistance, the overlap W is preferably at least 25 mm.

The overlap W is the width from a reference line of the innermost belt layer 7A when a reference line that passes through the end 4Ae of the inner carcass layer 4A and is orthogonal to the innermost belt layer 7A is found.

Figure 3:
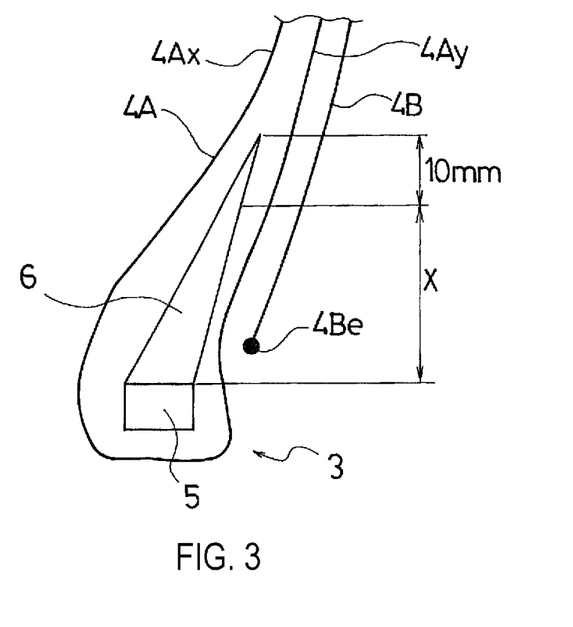
FIG. 3 is a cross-sectional view illustrating a magnified view of a bead portion of the pneumatic tire of FIG. 2.

As illustrated in FIG. 3, the end 4Be of the outer carcass layer 4B is disposed further outward in the tire radial direction than an outermost edge of the bead core 5 in the radial direction. Also, the end 4Be of the outer carcass layer 4B is disposed at a position separated from the outermost edge of the bead filler 6 in the tire radial direction by at least 10 mm toward the inner side in the tire radial direction. That is, the end 4Be of the outer carcass layer 4B is disposed in a region X defined between the outermost edge of the bead core 5 in the radial direction and the position separated from the outermost edge of the bead filler 6 by 10 mm toward the inner side in the tire radial direction. As such, good separation resistance is secured by ensuring sufficient overlap between the outer carcass layer 4B and the bead filler 6, while also enabling sufficient steering stability by avoiding overlap between the outer carcass layer 4B and the bead core 5. Having the end 4Be of the outer carcass layer 4B be further outward in the tire radial direction than the region X causes the end 4Be of the outer carcass layer 4B to approach a peak of the bead filler 6, thus decreasing the separation resistance. Conversely, having the end 4Be of the outer carcass layer 4B be further inward in the tire radial direction than the region X with the end of the outer carcass layer 4B being located to the side of the bead core 5 causes the position of the bead core 5 to be offset toward the inner side in the tire width direction when the tire is fitted onto the wheel. This decreases steering stability in that a desired fitting strength is not achieved. Also, upon disposing the end 4Be of the outer carcass layer 4B in the region X, the end 4Be approaching the peak of the bead filler 6 indicates low rolling resistance due to reduced weight, and the end 4Be approaching the bead core 5 indicates high steering stability due to increased rigidity. Furthermore, for considerations of durability, the end 4Be of the outer carcass layer 4B is preferably separated from a rim flange contact portion.

Figure 4:
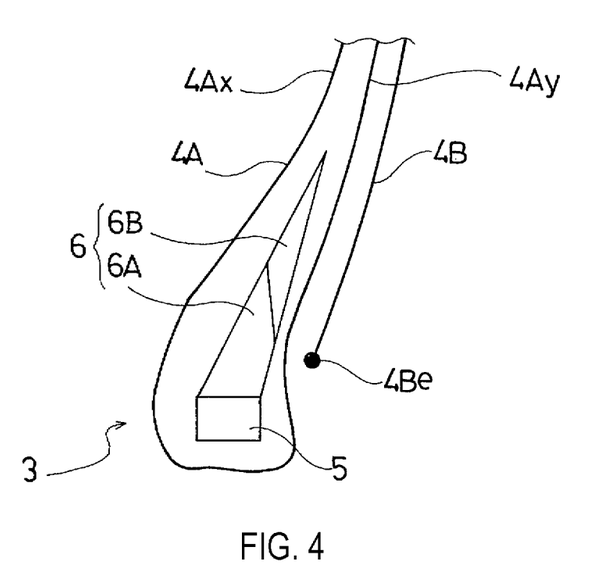
FIG. 4 is a cross-sectional view schematically illustrating a modified example of the bead portion of the pneumatic tire of FIG. 2.

The bead fillers 6 can be formed from a single rubber composition, or from multiple types of rubber compositions having different physical properties. In particular, it is preferable that the bead fillers 6 be divided in the tire radial direction into inner fillers 6A and outer fillers 6B as illustrated in FIG. 4, the ends 4Be of the outer carcass layer 4B being disposed adjacent to the inner fillers 6A, and the outer fillers 6B having a JIS hardness that is lower than the JIS hardness of the inner fillers 6A. More preferably, the JIS hardness of the outer filler 6B is lower than the JIS hardness of the inner filler 6A by at least five points. Accordingly, the rigidity in the tire radial direction is decreased, and rolling resistance may be reduced. Also, although bending deformation of the bead filler 6 may occur during traveling, the separation resistance may be improved by disposing the end 4Be of the outer carcass layer 4B at a position corresponding to the relatively harder inner filler 6A. Here, having the difference between the JIS hardness of the outer filler 6B and the JIS hardness of the inner filler 6A be less than five points makes the above-described effect unachievable. It is preferable for the JIS hardness of the inner fillers 6A to be set in a range from 80 to 95, and the JIS hardness of the outer fillers 6B to be set in a range from 75 to 90.

Figure 5:
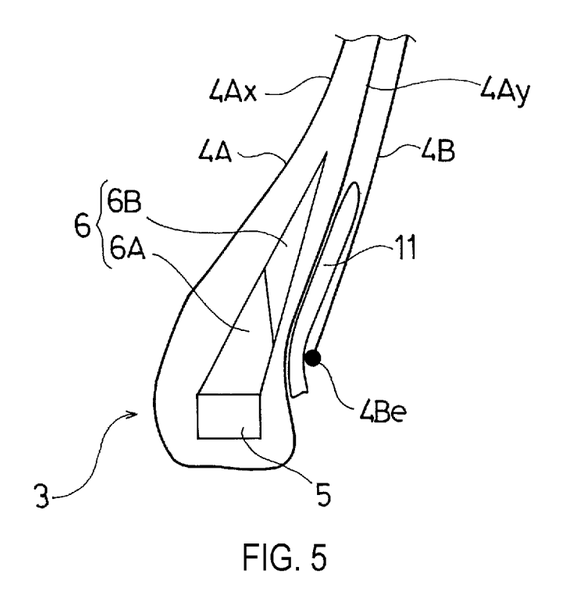
FIG. 5 is a cross-sectional view schematically illustrating a further modified example of the bead portion of the pneumatic tire of FIG. 2.
Figure 6:
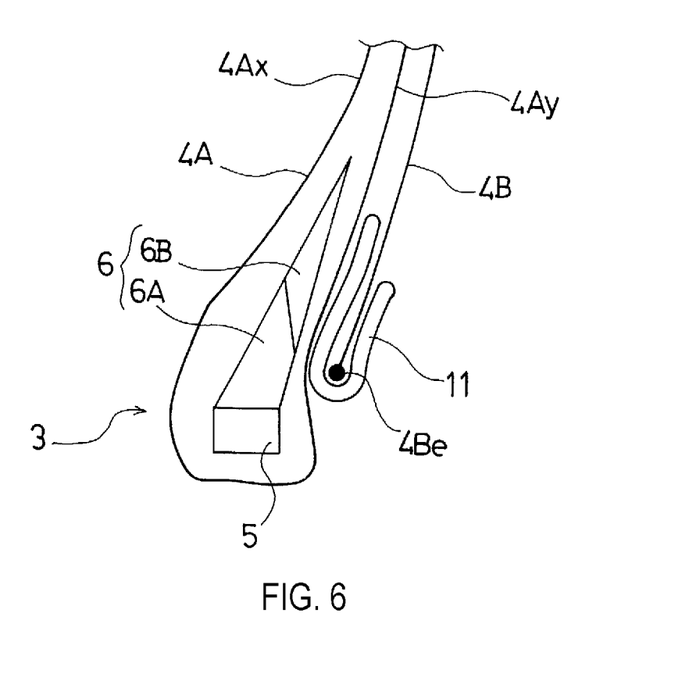
FIG. 6 is a cross-sectional view schematically illustrating a further modified example of the bead portion of the pneumatic tire of FIG. 2.

As illustrated in FIG. 5, a cushioning rubber layer 11 having a breaking strength of at least 20 MPa is preferably disposed between the end 4Be of the outer carcass layer 4B and the folded back portion 4Ay of the inner carcass layer 4A. Accordingly, separation failure originating at the end 4Be of the carcass layer 4B is suppressed, allowing for improved separation resistance. Particularly, as illustrated in FIG. 6, having the cushioning rubber layer 11 disposed so as to wrap around the ends 4Be of the outer carcass layer 4B from the inside and the outside produces a remarkable effectiveness in improving separation resistance. Having the breaking strength of the cushioning rubber layer 11 less than 20 MPa reduces the effectiveness in improving separation resistance. The cushioning rubber layer 11 preferably has a breaking strength of at least 25 MPa.

As alternate approach, a coating rubber of the inner carcass layer 4A and the outer carcass layer 4B may have a breaking strength of at least 20 MPa. In such a situation, the separation resistance may also be improved, similar to those described above. Naturally, while setting the breaking strength of the coating rubber of the inner carcass layer 4A and the outer carcass layer 4B to at least 20 MPa, the cushioning rubber layer 11 having the breaking strength of at least 20 MPa may also be inserted between the end 4Be of the outer carcass layer 4B and the folded back portion 4Ay of the inner carcass layer 4A. In such circumstances, this approach is equivalent to the structure in which the coating rubber in the vicinity of the end 4Be of the outer carcass layer 4B is locally thicker than other portions.

Figure 7:
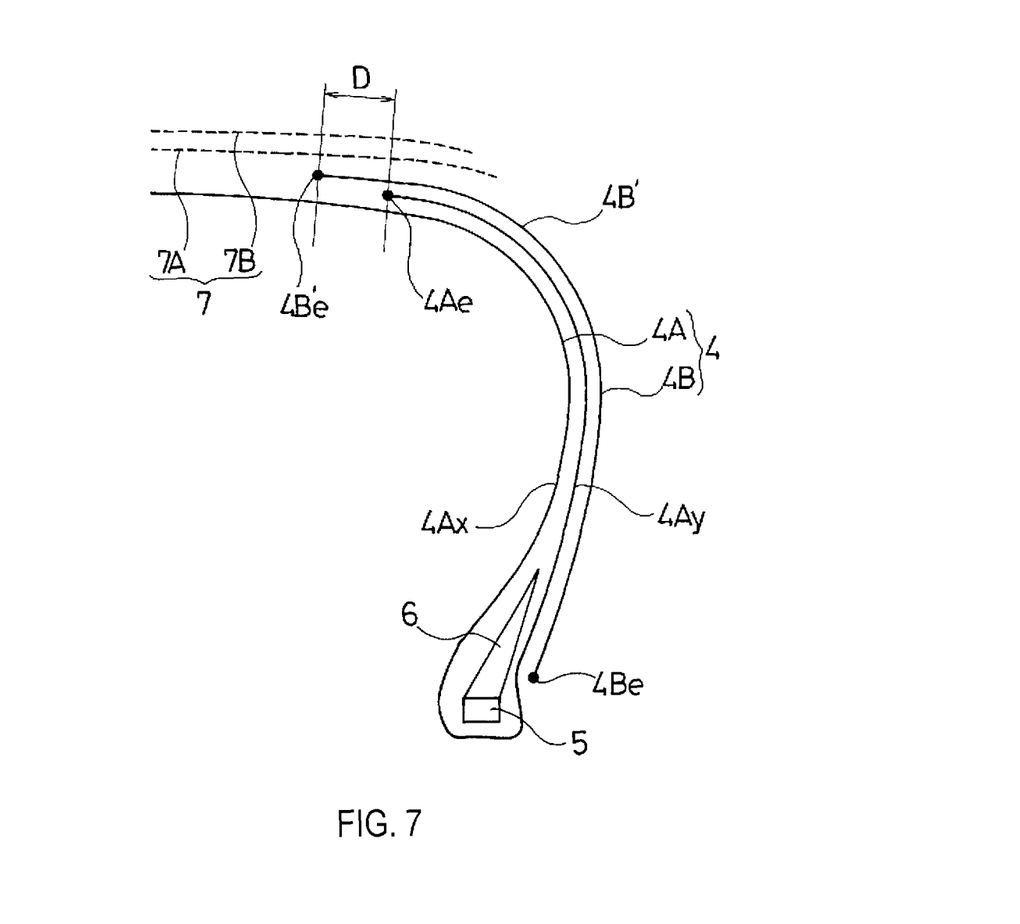
FIG. 7 is a half cross-sectional view taken along a meridian schematically illustrating a pneumatic tire according to another embodiment of the present technology.

FIG. 7 illustrates a pneumatic tire according to another embodiment of the present technology. In FIG. 7, components identical to those illustrated in FIGS. 1 to 3 are indicated by the same reference numerals. Detailed descriptions for these components are omitted.

As illustrated in FIG. 7, in the present embodiment, the outer carcass layer 4B has a hollow structure divided at the region underneath the belt layer 7. In such circumstances, an inner end 4Be' in the tire width direction of each section 4B' of the outer carcass layer 4B is preferably disposed at a position separated from the end 4Ae of the folded back portion 4Ay of the inner carcass layer 4A by at least 5 mm toward the inner side in the tire width direction. That is, a distance D from the end 4Ae of the folded back portion 4Ay of the inner carcass layer 4A to the inner end 4Be' in the tire width direction of the section 4B' of the outer carcass layer 4B is preferably set to at least 5 mm as measured toward the inner side in the tire width direction. In a situation where the outer carcass layer 4B has a hollow structure at the region underneath the belt layer 7, the tire weight may be reduced without leading to problems in tire performance. Here, having the distance D be less than 5 mm or having the inner end 4Be' in the tire width direction of each section 4B' of the outer carcass layer 4B be positioned further outward in the tire width direction than the ends 4Ae of the folded back portion 4Ay of the inner carcass layer 4A diminishes the separation resistance.

EXAMPLES

Pneumatic tires according to a Conventional Example, Comparative Examples 1 and 2, and Working Examples 1 to 7 with a size of 225/70R16 in which multiple carcass layers including multiple carcass cords were laid between a pair of bead portions, bead cores and bead fillers were disposed in the bead portions, and two belt layers were disposed on the outer circumferential sides of the carcass layers were produced using different carcass layer ply lock structures.

The tire of the Conventional Example had a 2-1F ply lock structure using three carcass layers (see FIG. 8) with both ends of inner carcass layers (a first ply and a second ply) being folded back around the bead core, while both ends of an outer carcass layer (a third ply) were disposed further outward in the tire width direction than the folded back portions of the inner carcass layer and extended to a position at least overlapping the bead filler, and both ends of the outer carcass layer terminated at the bead portions without being folded back around the bead core.

The tire of Comparative Example 1 had a 1-1F ply lock structure using two carcass layers with both ends of an inner carcass layer (a first ply) being folded back around the bead core, and the ends of the folded back portions of the inner carcass layer being disposed between an innermost belt layer and a main portion of the inner carcass layer, while both ends of an outer carcass layer (a second ply) terminated without being folded back around the bead core. In Comparative Example 1, both ends of the outer carcass layer were positioned further outward in the tire width direction than the folded back portion of the inner carcass layer and did not reach the bead fillers.

The tire of Comparative Example 2 had a 1-1F ply lock structure using two carcass layers with both ends of an inner carcass layer (a first ply) being folded back around the bead core, while both ends of an outer carcass layer (a second ply) being disposed further outward in the tire width direction than the folded back portions of the inner carcass layer and extended to a position at least overlapping the bead filler, and both ends of the outer carcass layer terminated at the bead portions without being folded back around the bead core. In Comparative Example 2, the ends of the folded back portions of the inner carcass layer did not reach the position overlapping the innermost belt layer.

The tires of Working Examples 1 to 7 each had a 1-1F ply lock structure using a two carcass layers (see FIGS. 1 to 7) with both ends of an inner carcass layer (a first ply) being folded back around the bead cores, and ends of the folded back portions of the inner carcass layer being disposed between the innermost belt layer and the main portion of the inner carcass layer. Meanwhile, both ends of an outer carcass layer (a second ply) were disposed further outward in the tire width direction than the folded back portions of the inner carcass layer and extended to a position at least overlapping the bead filler, and both ends of the outer carcass layer terminated at the bead portions without being folded back around the bead core.

In the tires of Working Examples 5 to 7 in particular, the bead fillers comprised inner fillers and outer fillers. In the tires of Working Examples 6 and 7, a cushioning rubber layer was disposed between each end of the outer carcass layer and the folded back portions of the inner carcass layer. In the tire of Working Example 7, the outer carcass layer had a hollow structure divided at the region underneath the belt layer 7. Also, an inner end in the tire width direction of each section of the outer carcass layer was disposed at a position separated from the end of the folded back portion of the inner carcass layer by 20 mm toward the inner side in the tire width direction.

In the Conventional Example, Comparative Examples 1 and 2, and Working Examples 1 to 7 described above, the end positions (i.e. distances outward in the tire radial direction from the outermost ends of the bead cores in the tire radial direction) of the carcass layers (first to third plies), the overlap W between the folded back portion of the inner carcass layer and the innermost belt layer, the JIS hardness of the bead fillers, the breaking strength of the carcass coating rubber, and the breaking strength of the cushioning rubber layer were set as shown in Table 1. Here, a negative value is given for the end position of the second ply for Working Example 4. This indicates that the end of the second ply was disposed below the bead cores.

The various test tires were evaluated for tire weight, rolling resistance, steering stability, and separation resistance according to the following evaluation methods; results are shown in Table 1.

Tire Weight

The weight of each test tire was measured. The evaluation results were expressed, using the inverse value as the measurement value, as an index with the Conventional Example being 100. Larger index values indicate lighter tire weight.

Rolling Resistance

The test tires were assembled on wheels having a rim size of 16×6½ JJ which were mounted on a rolling resistance tester provided with a 854 mm-radius drum, and pre-driving was performed for 30 minutes at an air pressure of 210 kPa, a load of 6.47 kN, and a speed of 80 km/h, after which rolling resistance was measured under the same conditions. The evaluation results were expressed, using the inverse value as the measurement value, as an index with the Conventional Example being 100. Higher index values indicate lower rolling resistance.

Steering Stability

The test tires were assembled on wheels having a rim size of 16×6½ JJ which were mounted on a test vehicle, and sensory evaluations were performed by a test driver on a test course at an air pressure of 210 kPa. The evaluation results were expressed as an index with the Conventional Example being 100. Larger index values indicate superior steering stability.

Separation Resistance

The test tires were assembled on wheels having a rim size of 16×6½ JJ which were a drum durability tester, a driving test was performed at an air pressure of 440 kPa, a load of 12.9 kN, and a speed of 81 km/h, and the traveling distance until separation failure of the carcass layers occurred was measured. The evaluation results were expressed as an index with the Conventional Example being 100. Larger index values indicate superior separation resistance.

TABLE 1

|  | Conventional Example | Comparative Example 1 | Comparative Example 2 |
|---|---|---|---|
| Ply Lock Structure | 2-1F | 1-1F | 1-1F |
| First Ply End Position (mm) | 75 | 160 | 50 |
| Second Ply End Position (mm) | 15 | 80 | 30 |
| Third Ply End Position (mm) | 5 | — | — |
| Overlap W | — | 50 | — |
| JIS Hardness of Bead Filler (Inner/Outer) | 90 | 90 | 90 |
| Breaking Strength of Carcass Coating Rubber (MPa) | 18 | 18 | 18 |
| Breaking Strength of Cushioning Rubber Layer (MPa) | — | — | — |
| Second Ply Hollow Structure | Absent | Absent | Absent |
| Tire Weight (index) | 100 | 112 | 116 |
| Rolling Resistance (index) | 100 | 106 | 108 |
| Steering Stability (index) | 100 | 90 | 90 |
| Separation Resistance (index) | 100 | 96 | 100 |

|  | Working Example 1 | Working Example 2 | Working Example 3 | Working Example 4 |
|---|---|---|---|---|
| Ply Lock Structure | 1-1F | 1-1F | 1-1F | 1-1F |
| First Ply End Position (mm) | 160 | 160 | 160 | 160 |
| Second Ply End Position (mm) | 30 | 30 | 0 | −10 |
| Third Ply End Position (mm) | — | — | — | — |
| Overlap W | 50 | 25 | 25 | 25 |
| JIS Hardness of Bead Filler (Inner/Outer) | 90 | 90 | 90 | 90 |
| Breaking Strength of Carcass Coating Rubber (MPa) | 18 | 18 | 18 | 18 |
| Breaking Strength of Cushioning Rubber Layer (MPa) | — | — | — | — |
| Second Ply Hollow Structure | Absent | Absent | Absent | Absent |
| Tire Weight (index) | 110 | 114 | 110 | 108 |
| Rolling Resistance (index) | 105 | 107 | 105 | 105 |
| Steering Stability (index) | 100 | 100 | 102 | 99 |
| Separation Resistance (index) | 110 | 110 | 114 | 110 |

|  | Working Example 5 | Working Example 6 | Working Example 7 |
|---|---|---|---|
| Ply Lock Structure | 1-1F | 1-1F | 1-1F |
| First Ply End Position (mm) | 160 | 160 | 160 |
| Second Ply End Position (mm) | 0 | 0 | 0 |
| Third Ply End Position (mm) | — | — | — |
| Overlap W | 25 | 25 | 25 |
| JIS Hardness of Bead Filler (Inner/Outer) | 90/85 | 90/85 | 90/85 |
| Breaking Strength of Carcass Coating Rubber (MPa) | 18 | 22 | 22 |
| Breaking Strength of Cushioning Rubber Layer (MPa) | — | 22 | 22 |
| Second Ply Hollow Structure | Absent | Absent | Present |
| Tire Weight (index) | 110 | 108 | 110 |
| Rolling Resistance (index) | 107 | 106 | 107 |
| Steering Stability (index) | 101 | 102 | 102 |

TABLE 1-continued

| Separation Resistance (index) | 115 | 118 | 118 |
|---|---|---|---|

As can be seen from Table 1, the tires of Working Examples 1 to 7 allowed for reductions in tire weight and rolling resistance compared to the Conventional Example while maintaining excellent steering stability, and also allowed for improved separation resistance.

Meanwhile, in the tire of Comparative Example 1, both ends of the outer carcass layer did not reach the bead filler, with the result that the steering stability was worse than in the Conventional Example, and separation resistance also decreased. In the tire of Comparative Example 2, the ends of the folded back portions of the inner carcass layer did not reach positions overlapping the innermost belt layer, with the result that steering stability was worse than in the conventional example, and separation resistance also decreased.

What is claimed is:

1. A pneumatic tire comprising:
    two carcass layers each including a plurality of carcass cords laid between a pair of bead portions;
    bead cores and bead fillers disposed in the bead portions;
    at least two belt layers disposed on an outer circumferential side of the carcass layers; and
    both ends of an inner carcass layer being folded back from a tire inner side to a tire outer side around the bead cores, and the ends of the folded back portions of the inner carcass layer being disposed between an innermost belt layer and a main portion of the inner carcass layer, both ends of an outer carcass layer being disposed further outward in a tire width direction than the folded back portions of the inner carcass layer and extending to a position at least overlapping the bead fillers, and both ends of the outer carcass layer being terminated at the bead portions without being folded back around the bead cores;
    wherein an end of the outer carcass layer is disposed further outward in a tire radial direction than an outermost edge of the bead cores in the tire radial direction, and the end of the outer carcass layer is separated from an outermost edge of the bead filler in the tire radial direction by at least 10 mm in the tire radial direction.

2. The pneumatic tire according to claim 1, wherein an overlap W between the folded back portion of the inner carcass layer and the innermost belt layer is from 5 mm to 40 mm.

3. The pneumatic tire according to claim 1, wherein the bead fillers are divided in a tire radial direction into inner fillers and outer fillers, the ends of the outer carcass layer are disposed further inward in the tire radial direction than the outer filler, and a JIS hardness of the outer filler is lower than a JIS hardness of the inner filler.

4. The pneumatic tire according to claim 1, wherein a cushioning rubber layer having a breaking strength of at least 20 MPa is disposed between the end of the outer carcass layer and the folded back portion of the inner carcass layer.

5. The pneumatic tire according to claim 1, wherein a coating rubber of the inner carcass layer and the outer carcass layer has a breaking strength of at least 20 MPa.

6. The pneumatic tire according to claim 1, wherein the outer carcass layer has a hollow structure divided at a region underneath the belt layer, and an inner end in a tire width direction of each section of the outer carcass layer is disposed at a position separated from the end of the folded back portion of the inner carcass layer by at least 5 mm in the tire width direction.

7. The pneumatic tire according to claim 2, wherein the bead fillers are divided in a tire radial direction into inner fillers and outer fillers, the ends of the outer carcass layer are disposed further inward in the tire radial direction than the outer filler, and a JIS hardness of the outer filler is lower than a JIS hardness of the inner filler.

8. The pneumatic tire according to claim 7, wherein the bead fillers are divided in the tire radial direction into inner fillers and outer fillers, the ends of the outer carcass layer are disposed further inward in the tire radial direction than the outer filler, and a JIS hardness of the outer filler is lower than a JIS hardness of the inner filler.

9. The pneumatic tire according to claim 2, wherein a cushioning rubber layer having a breaking strength of at least 20 MPa is disposed between the end of the outer carcass layer and the folded back portion of the inner carcass layer.

10. The pneumatic tire according to claim 9, wherein a cushioning rubber layer having a breaking strength of at least 20 MPa is disposed between the end of the outer carcass layer and the folded back portion of the inner carcass layer.

11. The pneumatic tire according to claim 3, wherein a cushioning rubber layer having a breaking strength of at least 20 MPa is disposed between the end of the outer carcass layer and the folded back portion of the inner carcass layer.

12. The pneumatic tire according to claim 2, wherein a coating rubber of the inner carcass layer and the outer carcass layer has a breaking strength of at least 20 MPa.

13. The pneumatic tire according to claim 12, wherein a coating rubber of the inner carcass layer and the outer carcass layer has a breaking strength of at least 20 MPa.

14. The pneumatic tire according to claim 3, wherein a coating rubber of the inner carcass layer and the outer carcass layer has a breaking strength of at least 20 MPa.

15. The pneumatic tire according to claim 2, wherein the outer carcass layer has a hollow structure divided at a region underneath the belt layer, and an inner end in a tire width direction of each section of the outer carcass layer is disposed at a position separated from the end of the folded back portion of the inner carcass layer by at least 5 mm in the tire width direction.

16. The pneumatic tire according to claim 15, wherein the outer carcass layer has a hollow structure divided at a region underneath the belt layer, and an inner end in a tire width direction of each section of the outer carcass layer is disposed at a position separated from the end of the folded back portion of the inner carcass layer by at least 5 mm in the tire width direction.

17. The pneumatic tire according to claim 3, wherein the outer carcass layer has a hollow structure divided at a region underneath the belt layer, and an inner end in a tire width direction of each section of the outer carcass layer is disposed at a position separated from the end of the folded back portion of the inner carcass layer by at least 5 mm in the tire width direction.

18. The pneumatic tire according to claim 4, wherein the outer carcass layer has a hollow structure divided at a region underneath the belt layer, and an inner end in a tire width direction of each section of the outer carcass layer is disposed at a position separated from the end of the folded back portion of the inner carcass layer by at least 5 mm in the tire width direction.

19. The pneumatic tire according to claim 1, wherein an overlap W between the folded back portion of the inner carcass layer and the innermost belt layer is from 5 mm to 20 mm.

20. The pneumatic tire according to claim 1, wherein the outer carcass layer has a hollow structure divided in a region underneath the belt layer, and an inner end in the tire width direction of each section of the outer carcass layer is disposed at a position separated from the end of the folded back portion of the inner carcass layer by at least 5 mm in the tire width direction.

* * * * *